United States Patent
Shyam et al.

(10) Patent No.: US 7,349,908 B2
(45) Date of Patent: Mar. 25, 2008

(54) METHOD FOR SPECIFYING A DYNAMIC CONSTRUCT IN A STORAGE MANAGEMENT SYSTEM

(75) Inventors: Sanjay Shyam, Los Altos, CA (US); Victor Sheng-Jian Liang, San Jose, CA (US); Savur Anand Rao, San Jose, CA (US); Stephen Merritt Branch, Morgan Hill, CA (US); Patricia Driscoll Choi, Apex, NC (US); Mark Edward Thomen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 10/079,973

(22) Filed: Feb. 21, 2002

(65) Prior Publication Data

US 2003/0158849 A1 Aug. 21, 2003

(51) Int. Cl.
*G06F 17/30* (2006.01)
(52) U.S. Cl. .................................. 707/100; 707/205
(58) Field of Classification Search ................. 395/281, 395/600, 822, 845; 707/200–204, 205, 100, 707/1–10, 104.1; 711/4, 111–112, 154, 161, 711/170–172
See application file for complete search history.

(56) References Cited

U.S. PATENT DOCUMENTS

| | | | |
|---|---|---|---|
| 4,310,883 A * | 1/1982 | Clifton et al. ............... | 707/205 |
| 5,247,660 A | 9/1993 | Ashcraft et al. ............. | 707/205 |
| 5,479,655 A | 12/1995 | Iwamoto et al. ............. | 707/205 |
| 5,506,986 A * | 4/1996 | Healy .......................... | 707/204 |
| 5,897,661 A | 4/1999 | Baranovsky et al. ........ | 711/170 |
| 6,023,744 A | 2/2000 | Shoroff et al. ................. | 711/4 |
| 6,088,764 A | 7/2000 | Shyam et al. ................ | 711/112 |
| 6,199,146 B1 | 3/2001 | Pence .......................... | 711/154 |
| 6,574,591 B1 | 6/2003 | Kleiman et al. | |
| 6,604,118 B2 | 8/2003 | Kleiman et al. | |
| 2003/0217082 A1 * | 11/2003 | Kleiman et al. ............. | 707/204 |

FOREIGN PATENT DOCUMENTS

| | | |
|---|---|---|
| JP | 2061732 A | 3/1990 |
| JP | 2000163446 A | 6/2000 |

* cited by examiner

*Primary Examiner*—Sam Rimell
*Assistant Examiner*—Mellissa M. Chojnacki
(74) *Attorney, Agent, or Firm*—Kunzler & McKenzie

(57) ABSTRACT

A dynamic construct is associated with one or more operational parameters of one or more components of a storage management system, wherein a pointer to the construct is retained in metadata for the storage management system, the values of the construct are stored in a first repository separate from a second repository normally used to store the metadata for the storage management system. The value of the construct in the first repository is allowed to change dynamically at any point of time without affecting the metadata in the second repository. Thereafter, the value of the construct in the first repository is retrieved and used as the operational parameter, instead of a static value in the metadata in the second repository. This provides a level of indirection that allows the construct to be applied dynamically in the storage management system.

27 Claims, 3 Drawing Sheets

METHOD FOR SPECIFYING A DYNAMIC CONSTRUCT IN A STORAGE MANAGEMENT SYSTEM

BACKGROUND

1. Field of the Invention

This invention relates in general to storage management systems, and in particular, to a method for specifying a dynamic construct in a storage management system.

2. Description of Related Art

Many computer systems limit the operational parameters of a file based on certain pre-established criteria in the metadata of the file system. Because of these limitations, it is often not possible to change the previously established limits without modifying the metadata. Moreover, any changes made to the metadata generally do not apply to files currently being accessed. This then forces applications to disconnect and reconnect to the files in order to make use of the updated metadata, which causes application outages and thus is not desirable or tolerable for continuous availability.

What is needed then is a method for dynamic parameter modification with a minimum of manual intervention. Such a method would give users an easy way of extending existing data sets that have reached their limits as indicated by the pre-defined operational parameters, without the users having to manually reallocate the data sets.

SUMMARY

To overcome the limitations in the prior art described above, and to overcome other limitations that will become apparent upon reading and understanding the present specification, the present invention discloses a method, system, and article of manufacture for specifying a dynamic construct that is associated with one or more operational parameters of one or more components of a storage management system. A pointer to the construct is retained in metadata for the storage management system, and the values of the construct are stored in a first repository separate from a second repository normally used to store the metadata for the storage management system. The value of the construct in the first repository is allowed to change dynamically at any point of time without affecting the metadata in the second repository. Thereafter, the value of the construct in the first repository is retrieved and used as the operational parameter, instead of a static value in the metadata in the second repository. This provides a level of indirection that allows the construct to be applied dynamically in the storage management system.

BRIEF DESCRIPTION OF THE DRAWINGS

Referring now to the drawings in which like reference numbers represent corresponding parts throughout.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Figure 1:
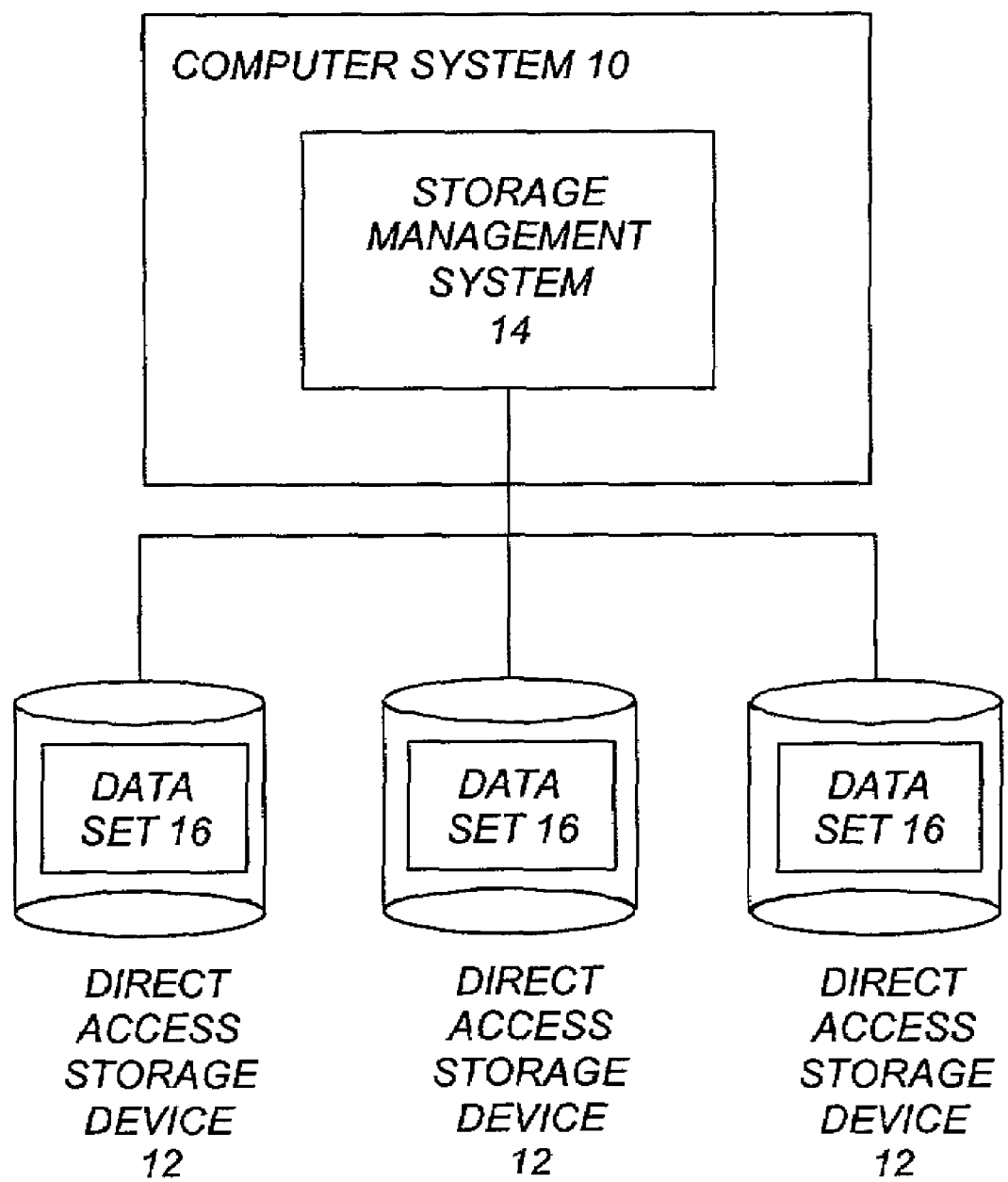
FIG. 1 is a block diagram that illustrates an exemplary hardware and software environment of the preferred embodiment of the present invention.

FIG. 1 schematically illustrates an exemplary hardware and software environment that could be used in the preferred embodiment of the present invention. A computer system 10 includes one or more direct access storage devices (DASDs) 12. Each DASD 12 is managed as a volume by a storage management subsystem (SMS) 14. Each volume managed by the SMS 14 may include one or more data sets 16.

In the preferred embodiment, the computer system 10 is an IBM® S/390 computer, although other computer systems could be used as well. The DASD 12 is an IBM® D/T3390 disk drive, although other data storage devices could be used as well. The SMS 14 is an IBM® Data Facility Storage Management System (DFSMS), although other storage management systems could be used as well.

In general, the present invention is implemented by logic and/or data within the SMS 14, as well as data stored outside the SMS 14, although other implementations could be used as well. Specifically, the logic and/or data, when read, interpreted, and/or executed, cause the computer system 10 to perform the steps for performing and/or using the present invention. Generally, the logic and/or data are embodied in and/or readable from a device, carrier or media, such as memory, data storage devices, and/or remote devices coupled to the computer via a data communications device.

Thus, the present invention may be implemented as a method, apparatus, article of manufacture, or data structure using standard programming and/or engineering techniques to produce software, hardware, firmware, or any combination thereof. In addition, the term "article of manufacture" as used herein is intended to encompass logic and/or data embodied in or accessible from any device, carrier, or media.

However, those skilled in the art will recognize that the exemplary environment and components illustrated in FIG. 1 are not intended to limit the present invention. Indeed, those skilled in the art will recognize that other alternative environments may be used without departing from the scope of the present invention.

In the preferred embodiment, operational parameters of the data sets 16 are stored in metadata for the SMS 14. As a result, it is not possible to change previously specified operational parameters without modifying the metadata. Moreover, any changes made to the metadata generally do not apply to data sets 16 that are currently being accessed by applications. This then forces the applications to disconnect and reconnect to the data set 16 in order to make use of the updated operational parameters stored in the metadata, which causes application outages and thus is not desirable or tolerable for continuous availability.

Figure 2:
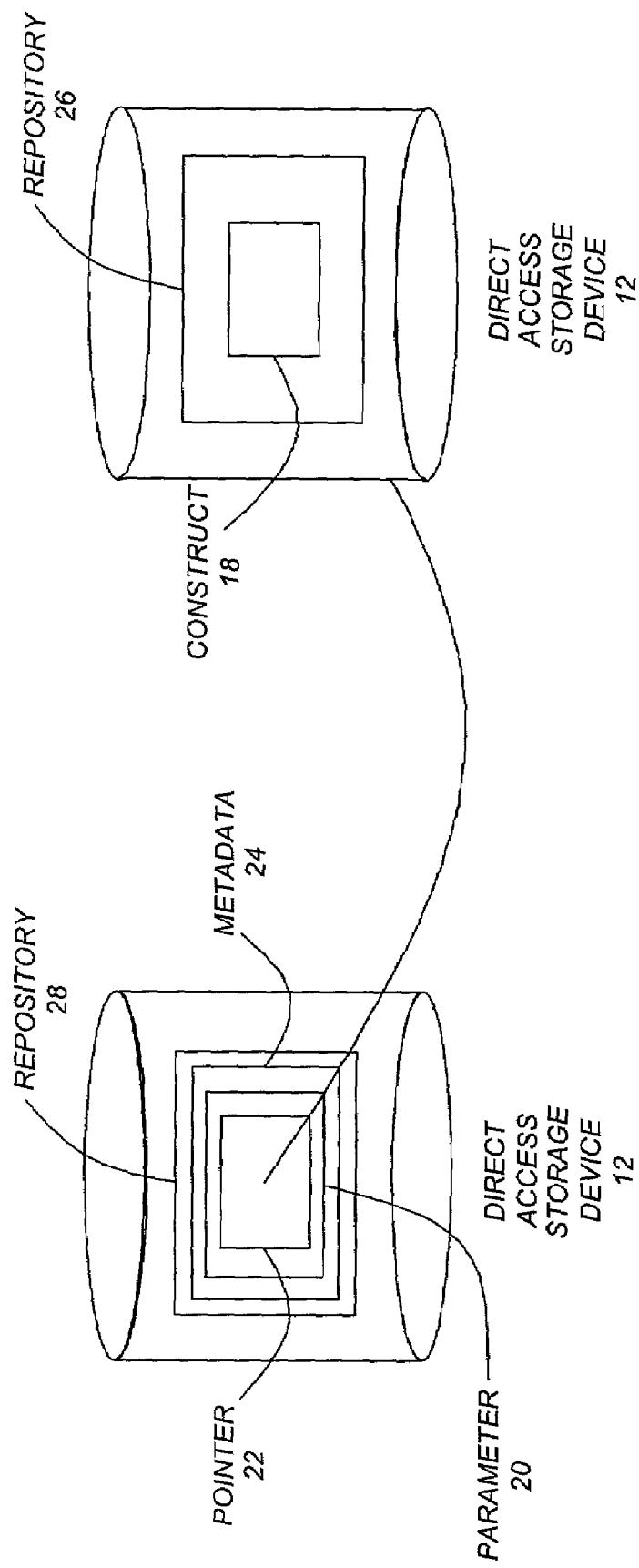
FIG. 2 is a block diagram that illustrates multiple repositories of the solution provided by the preferred embodiment of the present invention.

FIG. 2 is a block diagram that illustrates multiple repositories provided by the preferred embodiment of the present invention. A dynamic construct 18 is associated with one or more operational parameters 20 of one or more components of the SMS 14, wherein a pointer 22 to the construct 18 is retained in the metadata 24 for the SMS 14, and the values of the construct 18 are stored in a first repository 26 separate from a second repository 28 normally used to store the metadata 24 for the SMS 14.

In the preferred embodiment, the components comprise the data sets 16, the dynamic construct 18 comprises a value, the operational parameter 20 comprises a volume count (which indicates how many volumes a data set 16 may span), and the pointer 22 comprises a name of the construct 18, although other types of parameters, components and pointers could be used as well.

The value of the construct 18 in the first repository 26 is allowed to change dynamically at any point of time without affecting the metadata 24 in the second repository 28. Thereafter, the value of the construct 18 in the first repository 26 is retrieved and used as the operational parameter 20, instead of a static value stored in the metadata 22 in the second repository 28. This provides a level of indirection that allows the construct 18 to be applied dynamically to multiple components in the SMS 14.

Consequently, in the preferred embodiment, the dynamic volume count in the first repository 26 is allowed to change dynamically at any point of time without affecting the static volume count stored in the metadata in the second repository 28. Thereafter, the dynamic volume count in the first repository 26 is retrieved and used in place of the static volume count stored in the metadata in the second repository 28. This provides a level of indirection that allows the dynamic volume count to be applied dynamically to multiple data sets 16 in the SMS 14, without the need to disconnect or reconnect to the data sets 16 in the SMS 14.

One intent of the present invention is to provide a dynamic construct 18 for newly allocated components, as well as for existing components. For example, a dynamic volume count as parameter for a storage management system, as provided by the present invention, differs from a static volume count, as used in the prior art, in that it is a "flexible" volume count. Additionally, the dynamic construct makes it much easier to update or modify operational parameters 20 with a minimum of manual intervention. Finally, the dynamic construct 18 can be associated with any number of components, so that a change to the dynamic construct 18 can be applied to the associated components.

Figure 3:
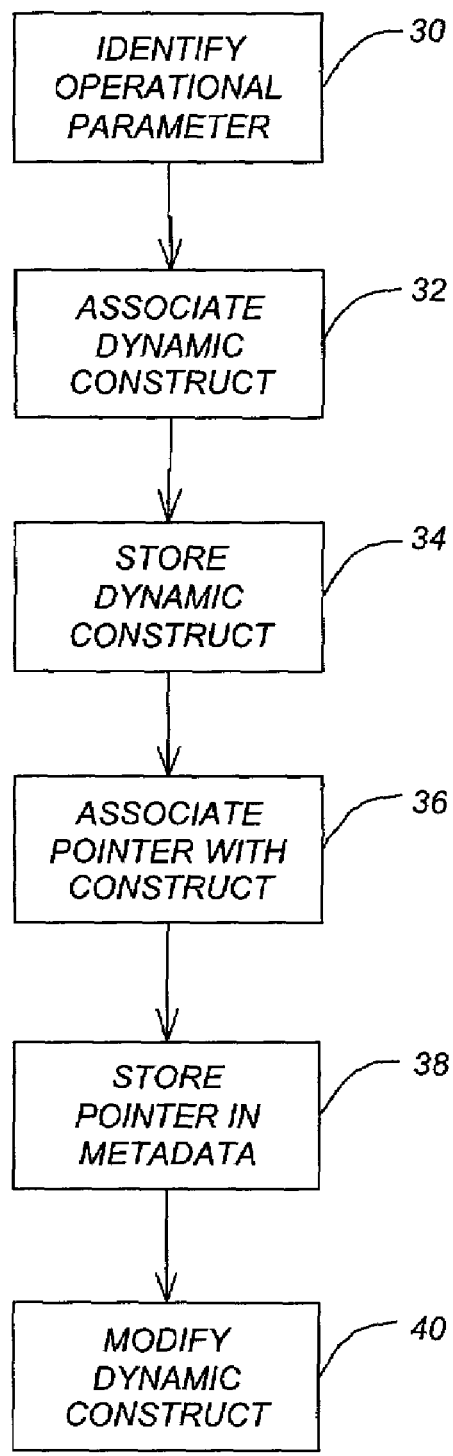
FIG. 3 is a flowchart that illustrates the logic performed by the preferred embodiment of the present invention.

FIG. 3 is a flowchart that illustrates the logic performed in specifying the dynamic construct 18 in the SMS 14 according to the preferred embodiment of the present invention. These steps need not be performed at the same time or in the specific sequence shown.

Block 30 represents an operational parameter of a component managed by the storage management system being identified. In the preferred embodiment, the component is a data set and the operational parameter is a dynamic volume count for the data set.

Block 32 represents a dynamic construct being associated with the identified operational parameter of the component managed by the storage management system. In the preferred embodiment, the dynamic construct is a value and the pointer is a name of the dynamic construct.

Block 34 represents the associated dynamic construct being stored in a first repository.

Block 36 represents a pointer being associated with the dynamic construct.

Block 38 represents the associated pointer being stored in metadata in a second repository managed by the storage management system.

Block 40 represents the dynamic construct being modified in order to dynamically change the operational parameter.

This concludes the description of the preferred embodiment of the invention. The following describes some alternative embodiments for accomplishing the present invention. For example, any type of environment could be used to implement the present invention. In addition, the present invention is not limited to storage management systems, but could be used in any number of different applications.

In summary, the present invention discloses a method, system, and article of manufacture for specifying a dynamic construct that is associated with one or more operational parameters of one or more components of a storage management system. A pointer to the construct is retained in metadata for the storage management system, and the values of the construct are stored in a first repository separate from a second repository normally used to store the metadata for the storage management system. The value of the construct in the first repository is allowed to change dynamically at any point of time without affecting the metadata in the second repository. Thereafter, the value of the construct in the first repository is retrieved and used as the operational parameter, instead of a static value stored in the metadata in the second repository.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A dynamic construct stored in a device, wherein the dynamic construct is associated with an operational parameter of a component managed by a storage management system, the dynamic construct is stored in a first repository, wherein the dynamic construct comprises a dynamic volume count, wherein the operational parameter comprises a volume count specifying how many volumes the component spans, and wherein the dynamic volume count comprises a volume count that changes without disconnecting the component, a pointer associated with the dynamic construct is stored in a second repository, wherein the pointer comprises one of a name and a location of the dynamic construct, and the dynamic construct is modified in order to dynamically change the operational parameter.

2. The dynamic construct of claim 1, wherein the component is a data set managed by the storage management system.

3. The dynamic construct of claim 2, wherein the operational parameter is a volume count for the data set managed by the storage management system.

4. The dynamic construct of claim 3, wherein the dynamic construct is a value.

5. The dynamic construct of claim 3, wherein the dynamic construct is a dynamic volume count for the data set managed by the storage management system.

6. The dynamic construct of claim 3, wherein the pointer is name of the dynamic construct.

7. An article of manufacture embodying logic for specifying a dynamic construct in a storage management system, the logic comprising:

(a) associating a dynamic construct with an operational parameter of a component of the storage management system, wherein the dynamic construct is stored in a first repository, wherein the dynamic construct comprises a dynamic volume count, wherein the operational parameter comprises a volume count specifying how many volumes the component spans, and wherein the dynamic volume count comprises a volume count that changes without disconnecting the component;

(b) associating a pointer with the dynamic construct, wherein the associated pointer is stored in a second repository, wherein the pointer comprises one of a name and a location of the dynamic construct; and (c) modifying the dynamic construct in order to change the operational parameter of the component of the storage management system.

8. The article of manufacture of claim 7, wherein the component is a data set managed by the storage management system.

9. The article of manufacture of claim 8, wherein the operational parameter is a volume count for the data set managed by the storage management system.

10. The article of manufacture of claim 9, wherein the dynamic construct is a value.

11. The article of manufacture of claim 9, wherein the dynamic construct is a dynamic volume count for the data set managed by the storage management system.

12. The article of manufacture of claim 9, wherein the pointer is a name of the dynamic construct.

13. The article of manufacture of claim 7, further comprising identifying the operational parameter of the component managed by the storage management system.

14. A computer-implemented method for specifying a dynamic construct in a storage management system, comprising:

(a) associating a dynamic construct with an operational parameter of a component of the storage management system, wherein the dynamic construct is stored in a first repository, wherein the dynamic construct comprises a dynamic volume count, wherein the operational parameter comprises a volume count specifying how many volumes the component spans, and wherein the dynamic volume count comprises a volume count that changes without disconnecting the component;

(b) associating a pointer with the dynamic construct, wherein the associated pointer is stored in a second repository, wherein the pointer comprises one of a name and a location of the dynamic construct; and (c) modifying the dynamic construct in order to change the operational parameter of the component of the storage management system.

15. The method of claim 14, wherein the component is a data set managed by the storage management system.

16. The method of claim 15, wherein the operational parameter is a volume count for the data set managed by the storage management system.

17. The method of claim 16, wherein the dynamic construct is a value.

18. The method of claim 16, wherein the dynamic construct is a dynamic volume count for the data set managed by the storage management system.

19. The method of claim 16, wherein the pointer is a name of the dynamic construct.

20. The method of claim 14, further comprising identifying the operational parameter of the component managed by the storage management system.

21. An apparatus for specifying a dynamic construct in a storage management system format, comprising:

(a) a computer; and (b) means, performed by the computer, for associating a dynamic construct with an operational parameter of a component of the storage management system, wherein the dynamic construct is stored in a first repository, wherein the dynamic construct comprises a dynamic volume count, wherein the operational parameter comprises a volume count specifying how many volumes the component spans, and wherein the dynamic volume count comprises a volume count that changes without disconnecting the component;

(c) means, performed by the computer, for associating a pointer with the dynamic construct, wherein the associated pointer is stored in a second repository, wherein the pointer comprises one of a name and a location of the dynamic construct; and (d) means, performed by the computer, for modifying the dynamic construct in order to change the operational parameter of the component of the storage management system.

22. The apparatus of claim 21, wherein the component is a data set managed by the storage management system.

23. The apparatus of claim 22, wherein the operational parameter is a volume count for the data set managed by the storage management system.

24. The apparatus of claim 23, wherein the dynamic construct is a value.

25. The apparatus of claim 23, wherein the dynamic construct is a dynamic volume count for the data set managed by the storage management system.

26. The apparatus of claim 23, wherein the pointer is a name of the dynamic construct.

27. The apparatus of claim 21, further comprising means for identifying the operational parameter of the component managed by the storage management system.

* * * * *